US012706717B2

(12) United States Patent
Jung et al.

(10) Patent No.: US 12,706,717 B2
(45) Date of Patent: Aug. 11, 2026

(54) CONFIGURING A REFERENCE SIGNAL RESOURCE SET BASED ON QUASI-CO-LOCATION INFORMATION

(71) Applicant: Lenovo (Singapore) Pte. Ltd., New Tech Park (SG)

(72) Inventors: Hyejung Jung, Northbrook, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 269 days.

(21) Appl. No.: 18/553,650

(22) PCT Filed: Mar. 30, 2022

(86) PCT No.: PCT/IB2022/052987
§ 371 (c)(1),
(2) Date: Oct. 2, 2023

(87) PCT Pub. No.: WO2022/208412
PCT Pub. Date: Oct. 6, 2022

(65) Prior Publication Data

US 2024/0187187 A1 Jun. 6, 2024

Related U.S. Application Data

(60) Provisional application No. 63/168,912, filed on Mar. 31, 2021.

(51) Int. Cl.
*H04L 5/00* (2006.01)
*H04B 7/06* (2006.01)

(52) U.S. Cl.
CPC ....... *H04L 5/0051* (2013.01); *H04B 7/06968* (2023.05)

(58) Field of Classification Search
CPC ..... H04L 5/0051; H04L 5/001; H04L 5/0023; H04L 5/0094; H04B 7/06968
See application file for complete search history.

(56) References Cited

U.S. PATENT DOCUMENTS

2016/0164966 A1* 6/2016 El Khayat ............ H04L 67/104 709/204
2019/0349051 A1* 11/2019 Sarkis ................. H04B 17/309
(Continued)

FOREIGN PATENT DOCUMENTS

EP 0347131 A2 12/1989
EP 3471318 A1 4/2019
WO 2020059153 A1 3/2020

OTHER PUBLICATIONS

PCT/IB2022/052987, "International Search Report and the Written Opinion of the International Searching Authority, or the Declaration", International Searching Authority, Jun. 20, 2022, pp. 1-11.
(Continued)

*Primary Examiner* — Kiet Tang
(74) *Attorney, Agent, or Firm* — Kunzler Needham & Hilton; Bruce R. Needham

(57) ABSTRACT

Apparatuses, methods, and systems are disclosed for configuring a reference signal resource set based on quasi-co-location information. One method includes receiving, at a user equipment (UE), a set of reference signal (RS) resource set configurations. Each RS resource set configuration of the set of RS resource set configurations includes one quasi-co-collocation (QCL) information. The method includes receiving a plurality of reference signals of a RS resource set based on QCL information corresponding to the RS resource set. The RS resource set is configured according to a RS resource set configuration of the set of RS resource set configurations.

15 Claims, 11 Drawing Sheets

(56) References Cited

U.S. PATENT DOCUMENTS

2020/0267768 A1* 8/2020 Hakola ................. H04L 5/0091
2020/0412506 A1* 12/2020 Määttanen ........... H04B 7/0413
2021/0037532 A1* 2/2021 Nam ....................... H04L 5/005

OTHER PUBLICATIONS

Mediatek Inc., "New WID: UE Power Saving Enhancements", 3GPP TSG RAN Meeting #86 RP-193239, Dec. 9-12, 2019, pp. 1-5.
3GPP, "3rd Generation Partnership Project; Technical Specification Group Radio Access Network; NR; Physical channels and modulation (Release 16)", 3GPP TS 38.211 V16.4.0, Dec. 2020, pp. 1-133.
3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.
3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.
3GPP, "3rd Generation Partnership Project; Technical Specification Group Radio Access Network; NR; User Equipment (UE) procedures in Idle mode and RRC Inactive state (Release 16)", 3GPP TS 38.304 V16.3.0, Dec. 2020, pp. 1-39.
3GPP, "3rd Generation Partnership Project; Technical Specification Group Radio Access Network; NR; User Equipment (UE) radio access capabilities (Release 16)", 3GPP TS 38.306 V16.3.0, Dec. 2020, pp. 1-135.
3GPP, "3rd Generation Partnership Project; Technical Specification Group Radio Access Network; NR; Radio Resource Control (RRC) protocol specification (Release 16)", 3GPP TS 38.331 V16.3.1, Jan. 2021, pp. 1-932.

* cited by examiner

400

```
-- ASN1START
-- TAG-DOWNLINKCONFIGCOMMONSIB-START

DownlinkConfigCommonSIB ::=     SEQUENCE {
    frequencyInfoDL                 FrequencyInfoDL-SIB,
    initialDownlinkBWP              BWP-DownlinkCommon,
    bcch-Config                         BCCH-Config,
    pcch-Config                         PCCH-Config,
    ...
}


BCCH-Config ::=                 SEQUENCE {
    modificationPeriodCoeff         ENUMERATED {n2, n4, n8, n16},
    ...
}


PCCH-Config ::=             SEQUENCE {
    defaultPagingCycle                  PagingCycle,
    nAndPagingFrameOffset               CHOICE {
        oneT                                NULL,
        halfT                               INTEGER (0..1),
        quarterT                            INTEGER (0..3),
        oneEighthT                          INTEGER (0..7),
        oneSixteenthT                       INTEGER (0..15)
    },
    ns                                  ENUMERATED {four, two, one},
    firstPDCCH-MonitoringOccasionOfPO   CHOICE {
        sCS15KHZoneT                                                                    SEQUENCE (SIZE
(1..maxPO-perPF)) OF INTEGER (0..139),
        sCS30KHZoneT-SCS15KHZhalfT                                                      SEQUENCE (SIZE
(1..maxPO-perPF)) OF INTEGER (0..279),
        sCS60KHZoneT-SCS30KHZhalfT-SCS15KHZquarterT                                     SEQUENCE (SIZE
(1..maxPO-perPF)) OF INTEGER (0..559),
        sCS120KHZoneT-SCS60KHZhalfT-SCS30KHZquarterT-SCS15KHZoneEighthT                 SEQUENCE (SIZE
(1..maxPO-perPF)) OF INTEGER (0..1119),
        sCS120KHZhalfT-SCS60KHZquarterT-SCS30KHZoneEighthT-SCS15KHZoneSixteenthT    SEQUENCE (SIZE
(1..maxPO-perPF)) OF INTEGER (0..2239),
        sCS120KHZquarterT-SCS60KHZoneEighthT-SCS30KHZoneSixteenthT                      SEQUENCE (SIZE
(1..maxPO-perPF)) OF INTEGER (0..4479),
        sCS120KHZoneEighthT-SCS60KHZoneSixteenthT                                       SEQUENCE (SIZE
(1..maxPO-perPF)) OF INTEGER (0..8959),
        sCS120KHZoneSixteenthT                                                          SEQUENCE (SIZE
(1..maxPO-perPF)) OF INTEGER (0..17919)
    }       OPTIONAL,           -- Need R
    ...,
    [[
    nrofPDCCH-MonitoringOccasionPerSSB-InPO-r16                                     INTEGER (2..4)
OPTIONAL  -- Cond SharedSpectrum2
    ]]
}

-- TAG-DOWNLINKCONFIGCOMMONSIB-STOP
-- ASN1STOP
```

```
-- ASN1START
-- TAG-TRS-RESOURCESETCOMMON-START

TRS-ResourceCommon ::=               SEQUENCE {
    TRS-ResourceSetList       SEQUENCE (SIZE (1..maxNrofTRS-ResourceSetsPerCell)) OF TRS-
ResourceSetId

}

-- TAG-TRS-RESOURCESETCommon-STOP
-- ASN1STOP
```

```
-- ASN1START
-- TAG-TRS-RESOURCESET-START
TRS-ResourceSet ::=            SEQUENCE {
    TRS-ResourceSetId                       TRS-ResourceSetId,

    n-NZP-CSI-RS                            INTEGER (2, 4)
    resourceMapping                         TRS-ResourceMapping,
    powerControlOffsetSS                    ENUMERATED{db-3, db0, db3, db6}                 OPTIONAL,
-- Need R
    scramblingID                            ScramblingId,
    qcl-InfoTRS                             SSB-ID                OPTIONAL,    -- Need
    periodicityAndOffset                    CSI-ResourcePeriodicityAndOffset
}

-- TAG-TRS-RESOURCESET-STOP
-- ASN1STOP
```

```
-- ASN1START
-- TAG-TRS-RESOURCEMAPPING-START

TRS-ResourceMapping ::=          SEQUENCE {
    frequencyDomainAllocation           BIT STRING (SIZE (4)),
    firstOFDMSymbolInTimeDomain         INTEGER (0..13),
    freqBand                            CSI-FrequencyOccupation,
    ...
}

-- TAG-TRS-RESOURCEMAPPING-STOP
-- ASN1STOP
```

```
-- ASN1START
-- TAG-CSI-RESOURCEPERIODICITYANDOFFSET-START

CSI-ResourcePeriodicityAndOffset ::=    CHOICE {
    slots4                                  INTEGER (0..3),
    slots5                                  INTEGER (0..4),
    slots8                                  INTEGER (0..7),
    slots10                                 INTEGER (0..9),
    slots16                                 INTEGER (0..15),
    slots20                                 INTEGER (0..19),
    slots32                                 INTEGER (0..31),
    slots40                                 INTEGER (0..39),
    slots64                                 INTEGER (0..63),
    slots80                                 INTEGER (0..79),
    slots160                                INTEGER (0..159),
    slots320                                INTEGER (0..319),
    slots640                                INTEGER (0..639)
}

-- TAG-CSI-RESOURCEPERIODICITYANDOFFSET-STOP
-- ASN1STOP
```

FIG. 8

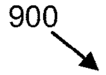

```
-- ASN1START
-- TAG-TRS-RESOURCECOMMON2-START
TRS-ResourceCommon2 ::=          SEQUENCE {
    trs-qclPositionsInBurst                      CHOICE {
        shortBitmap                               BIT STRING (SIZE (4)),
        mediumBitmap                              BIT STRING (SIZE (8)),
        longBitmap                                BIT STRING (SIZE (64))
  }
    n-NZP-CSI-RS-perOccasion              INTEGER {2, 4}
    resourceMapping                       TRS-ResourceMapping,
    powerControlOffsetSS                  ENUMERATED{db-3, db0, db3, db6}                    OPTIONAL,
-- Need R
    scramblingID                          ScramblingId,
    periodicityAndOffset                  CSI-ResourcePeriodicityAndOffset
}

-- TAG-TRS-RESOURCECOMMON2-STOP
-- ASN1STOP
```

FIG. 9

CONFIGURING A REFERENCE SIGNAL RESOURCE SET BASED ON QUASI-CO-LOCATION INFORMATION

CROSS-REFERENCE TO RELATED APPLICATIONS

This application claims priority to U.S. Patent Application Ser. No. 63/168,912 entitled "APPARATUSES, METHODS, AND SYSTEMS FOR PROVISION OF REFERENCE SIGNALS CORRESPONDING TO MULTIPLE BEAMS FOR IDLE AND/OR INACTIVE USER EQUIPMENT" and filed on Mar. 31, 2021 for Hyejung Jung, which is incorporated herein by reference in its entirety.

FIELD

The subject matter disclosed herein relates generally to wireless communications and more particularly relates to configuring a reference signal resource set based on quasi-co-location information.

BACKGROUND

In certain wireless communications networks, time, frequency, and/or spatial synchronization using various reference signals may be required to perform communications. In such networks, the reference signals may need to be provisioned such that a user equipment and a network device can operate in a power efficient manner.

BRIEF SUMMARY

Methods for configuring a reference signal resource set based on quasi-co-location information are disclosed. Apparatuses and systems also perform the functions of the methods. One embodiment of a method includes receiving, at a user equipment (UE), a set of reference signal (RS) resource set configurations. Each RS resource set configuration of the set of RS resource set configurations includes one quasi-co-collocation (QCL) information. In some embodiments, the method includes receiving a plurality of reference signals of a RS resource set based on QCL information corresponding to the RS resource set. The RS resource set is configured according to a RS resource set configuration of the set of RS resource set configurations.

One apparatus for configuring a reference signal resource set based on quasi-co-location information includes a user equipment (UE). In some embodiments, the apparatus includes a receiver that: receives a set of reference signal (RS) resource set configurations, wherein each RS resource set configuration of the set of RS resource set configurations includes one quasi-co-collocation (QCL) information; and receives a plurality of reference signals of a RS resource set based on QCL information corresponding to the RS resource set. The RS resource set is configured according to a RS resource set configuration of the set of RS resource set configurations.

Another embodiment of a method for configuring a reference signal resource set based on quasi-co-location information includes transmitting, from a network device, a set of reference signal (RS) resource set configurations. Each RS resource set configuration of the set of RS resource set configurations includes one quasi-co-collocation (QCL) information. In some embodiments, the method includes transmitting a plurality of reference signals of a RS resource set based on QCL information corresponding to the RS resource set. The RS resource set is configured according to a RS resource set configuration of the set of RS resource set configurations.

Another apparatus for configuring a reference signal resource set based on quasi-co-location information includes a network device. In some embodiments, the apparatus includes a transmitter that: transmits a set of reference signal (RS) resource set configurations, wherein each RS resource set configuration of the set of RS resource set configurations includes one quasi-co-collocation (QCL) information; and transmits a plurality of reference signals of a RS resource set based on QCL information corresponding to the RS resource set. The RS resource set is configured according to a RS resource set configuration of the set of RS resource set configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a diagram illustrating one embodiment of a DownlinkConfigCommonSIB IE;

FIG. 5 is a diagram illustrating one embodiment of a TRS-ResourceCommon IE;

FIG. 6 is a diagram illustrating one embodiment of a TRS-ResourceSet IE;

FIG. 7 is a diagram illustrating one embodiment of a TRS-ResourceMapping IE;

FIG. 8 is a diagram illustrating one embodiment of a CSI-ResourcePeriodicityAndOffset IE;

FIG. 9 is a diagram illustrating one embodiment of a TRS-ResourceCommon2 IE;

DETAILED DESCRIPTION

Figure 1:
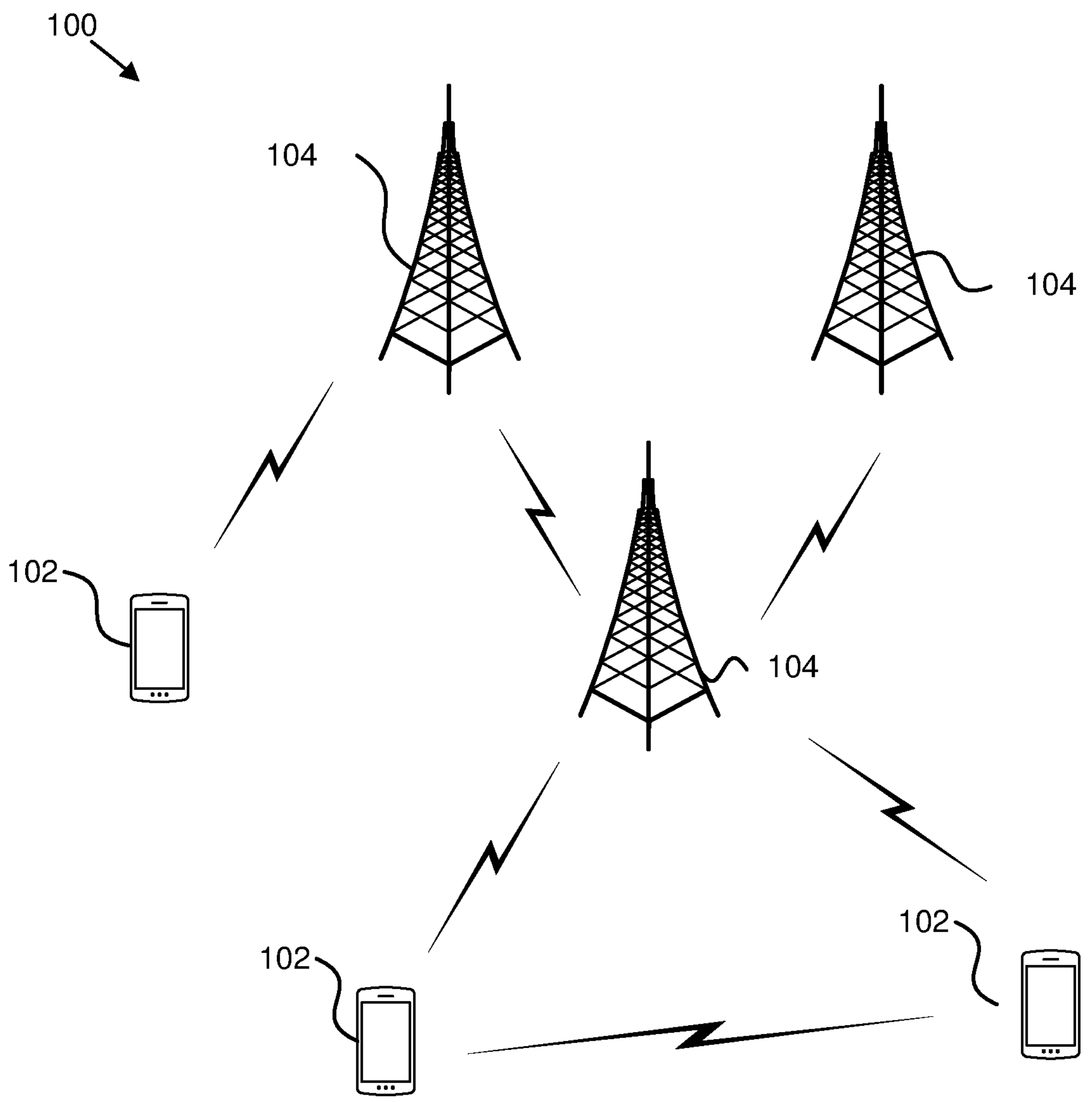
FIG. 1 is a schematic block diagram illustrating one embodiment of a wireless communication system for configuring a reference signal resource set based on quasi-co-location information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a reference signal resource set based on quasi-co-location information. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfox, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment (UE), a set of reference signal (RS) resource set configurations. Each RS resource set configuration of the set of RS resource set configurations includes one quasi-co-collocation (QCL) information. In some embodiments, the remote unit 102 may receive a plurality of reference signals of a RS resource set based on QCL information corresponding to the RS resource set. The RS resource set is configured according to a RS resource set configuration of the set of RS resource set configurations. Accordingly, the remote unit 102 may be used for configuring a reference signal resource set based on quasi-co-location information.

In certain embodiments, a network unit 104 may transmit, from a network device, a set of reference signal (RS) resource set configurations. Each RS resource set configuration of the set of RS resource set configurations includes one quasi-co-collocation (QCL) information. In some embodiments, the network unit 104 may transmit a plurality of reference signals of a RS resource set based on QCL information corresponding to the RS resource set. The RS resource set is configured according to a RS resource set configuration of the set of RS resource set configurations. Accordingly, the network unit 104 may be used for configuring a reference signal resource set based on quasi-co-location information.

Figure 2:
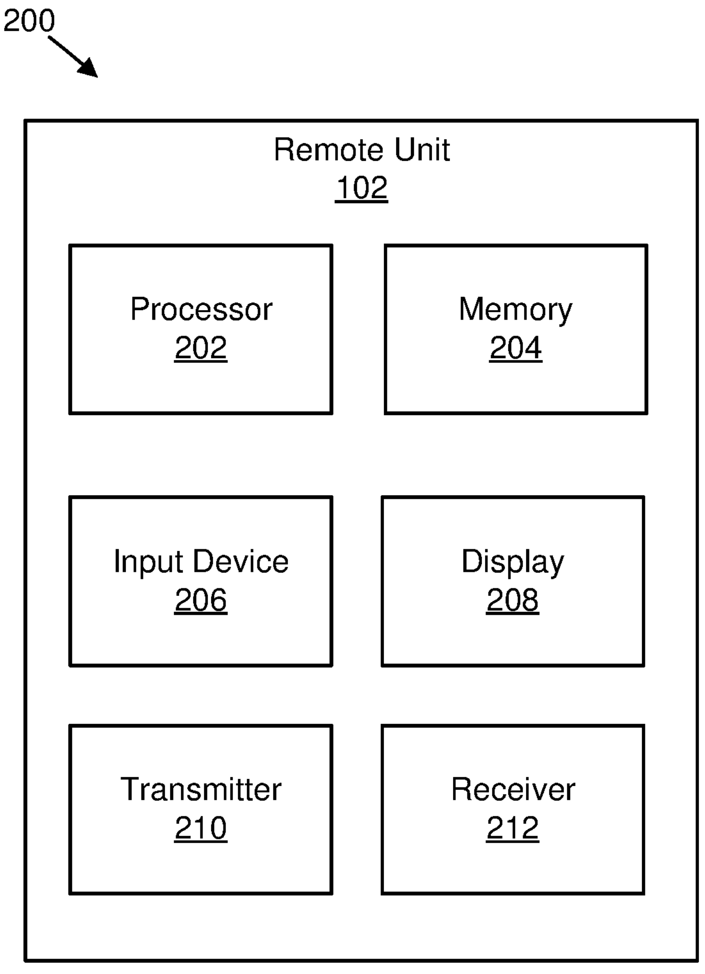
FIG. 2 is a schematic block diagram illustrating one embodiment of an apparatus that may be used for configuring a reference signal resource set based on quasi-co-location information.

FIG. 2 depicts one embodiment of an apparatus 200 that may be used for configuring a reference signal resource set based on quasi-co-location information. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212: receives a set of reference signal (RS) resource set configurations, wherein each RS resource set configuration of the set of RS resource set configurations includes one quasi-co-collocation (QCL) information; and receives a plurality of reference signals of a RS resource set based on QCL information corresponding to the RS resource set. The RS resource set is configured according to a RS resource set configuration of the set of RS resource set configurations.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
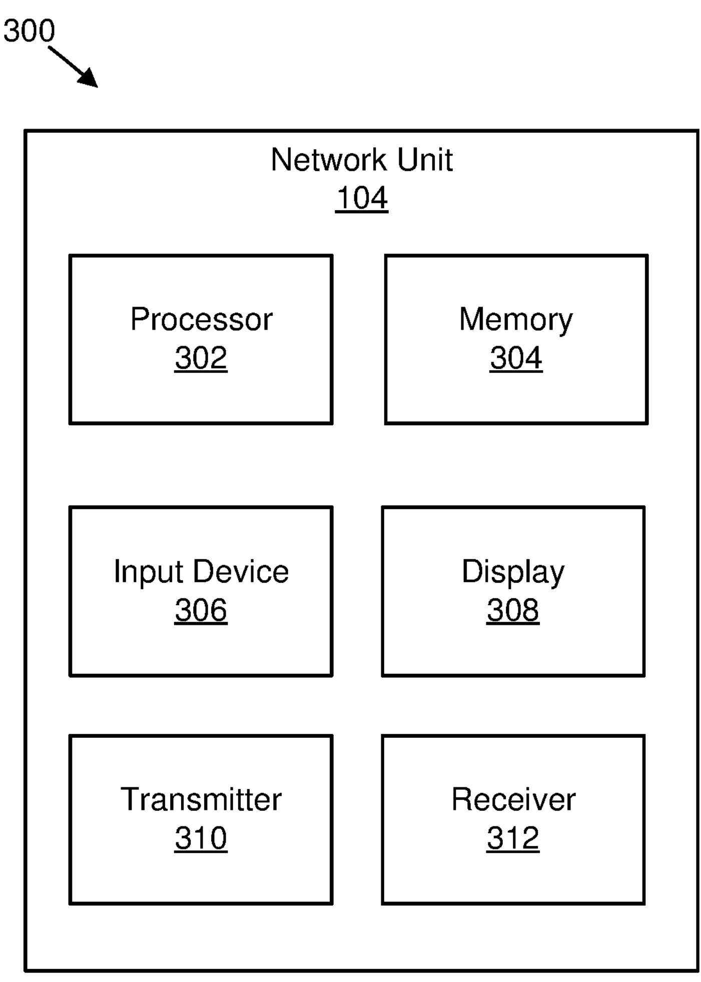
FIG. 3 is a schematic block diagram illustrating one embodiment of an apparatus that may be used for configuring a reference signal resource set based on quasi-co-location information.

FIG. 3 depicts one embodiment of an apparatus 300 that may be used for configuring a reference signal resource set based on quasi-co-location information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a set of reference signal (RS) resource set configurations, wherein each RS resource set configuration of the set of RS resource set configurations includes one quasi-co-collocation (QCL) information; and transmits a plurality of reference signals of a RS resource set based on QCL information corresponding to the RS resource set. The RS resource set is configured according to a RS resource set configuration of the set of RS resource set configurations.

It should be noted that one or more embodiments described herein may be combined into a single embodiment.

In certain embodiments, user equipment ("UE") power saving enhancements may include: 1) enhancements for idle and/or inactive-mode UE power saving, considering system performance aspects; 2) enhancements to reduce unnecessary UE paging receptions, subject to no impact to legacy UEs (e.g., radio access network ("RAN") to check and update evaluation methodology); and/or 3) means to provide potential tracking reference signal ("TRS") and/or channel state information ("CSI") reference signal ("RS") ("CSI-RS") occasions available in a connected mode to idle and/or inactive-mode UEs thereby minimizing system overhead impact. In such embodiments, always-on TRS and/or CSI-RS transmission by a gNB is not required.

In some embodiments, before an idle or inactive mode UE monitors paging DCI on a paging occasion, the UE may have to perform measurements on at least one synchronization signal ("SS") and/or physical broadcast channel ("PBCH") ("SS/PBCH") block ("SSB") of a camped cell to achieve necessary time and frequency synchronization, to select a suitable SSB, and to determine a paging DCI monitoring occasion corresponding to the selected SSB. Multiple SSB measurements may be needed if the UE is operated in a low signal-to-interference and noise ratio ("SINR") condition. Further, certain SSB and paging configurations may result in a large time difference between an SSB occasion and the paging occasion for the UE, which may deteriorate time, frequency, and/or beam tracking accuracy. Thus, it may be beneficial to provide additional reference signals ("RS") such as channel state information-reference signal ("CSI-RS") occasions configured as tracking reference signals ("TRSs") to the idle and/or inactive UE so that the idle and/or inactive UE can use those additional RS for automatic gain control ("AGC") setting, time and/or frequency tracking, and/or radio resource management ("RRM") measurement for a serving cell.

In various embodiments, there may be methods to provide quasi-co-location ("QCL") information of additional RS provisioned to idle and/or inactive UEs for UE power saving and improved time, frequency, and/or beam tracking.

In certain embodiments, a CSI-RS may be used for time and/or frequency tracking, channel state information ("CSI") computation, layer 1 ("L1") reference signal received power ("RSRP") ("L1-RSRP") computation, and/or L1 SINR ("L1-SINR") computation and mobility.

For a CSI-RS resource associated with a non-zero power ("NZP") CSI-RS resource set ("NZP-CSI-RS-ResourceSet") with the higher layer parameter repetition set to 'on', the UE shall not expect to be configured with CSI-RS over the symbols during which the UE is also configured to monitor the control resource set ("CORESET"), while for other NZP-CSI-RS-ResourceSet configurations, if the UE is configured with a CSI-RS resource and a search space set associated with a CORESET in the same orthogonal frequency division multiplexing ("OFDM") symbols, the UE may assume that the CSI-RS and a physical downlink control channel ("PDCCH") demodulation reference signal ("DM-RS", "DMRS") transmitted in all the search space sets associated with CORESET are quasi co-located with 'QCL-TypeD', if 'QCL-TypeD' is applicable. This also applies to the case when CSI-RS and the CORESET are in different intra-band component carriers, if 'QCL-TypeD' is applicable. Furthermore, the UE shall not expect to be configured with the CSI-RS in physical resource blocks ("PRBs") that overlap those of the CORESET in the OFDM symbols occupied by the search space set(s).

The UE is not expected to receive CSI-RS and a system information block ("SIB") 1 ("SIB1") message in the overlapping PRBs in the OFDM symbols where SIB1 is transmitted.

If the UE is configured with discontinuous reception ("DRX"): 1) if the UE is configured to monitor downlink control information ("DCI") format 2_6 and configured by higher layer parameter ps-TransmitOtherPeriodicCSI to report CSI with the higher layer parameter reportConfigType set to 'periodic' and reportQuantity set to quantities other than 'cri-RSRP' and 'ssb-Index-RSRP' when drx-onDurationTimer is not started, the most recent CSI measurement occasion occurs in DRX active time or during the time duration indicated by drx-onDurationTimer also outside DRX active time for CSI to be reported; 2) if the UE is configured to monitor DCI format 2_6 and configured by higher layer parameter ps-TransmitPeriodicL1-RSRP to report L1-RSRP with the higher layer parameter reportConfigType set to 'periodic' and reportQuantity set to cri-RSRP when drx-onDurationTimer is not started, the most recent CSI measurement occasion occurs in DRX active time or during the time duration indicated by drx-onDurationTimer also outside DRX active time for CSI to be reported; and 3) otherwise, the most recent CSI measurement occasion occurs in DRX active time for CSI to be reported.

In some embodiments, a UE in a radio resource control ("RRC") connected mode is expected to receive a higher layer UE specific configuration of a NZP-CSI-RS-ResourceSet configured with higher layer parameter trs-Info.

For an NZP-CSI-RS-ResourceSet configured with the higher layer parameter trs-Info, the UE shall assume the antenna port with the same port index of the configured NZP CSI-RS resources in the NZP-CSI-RS-ResourceSet is the same: 1) for frequency range 1, the UE may be configured with one or more NZP CSI-RS sets, where a NZP-CSI-RS-ResourceSet includes four periodic NZP CSI-RS resources in two consecutive slots with two periodic NZP CSI-RS resources in each slot—if no two consecutive slots are indicated as downlink slots by tdd-UL-DL-Configuration-Common or tdd-UL-DL-ConfigDedicated, then the UE may be configured with one or more NZP CSI-RS sets, where a NZP-CSI-RS-ResourceSet includes two periodic NZP CSI-RS resources in one slot; and 2) for frequency range 2 the UE may be configured with one or more NZP CSI-RS sets, where a NZP-CSI-RS-ResourceSet includes two periodic CSI-RS resources in one slot or with a NZP-CSI-RS-ResourceSet of four periodic NZP CSI-RS resources in two consecutive slots with two periodic NZP CSI-RS resources in each slot.

In various embodiments, a UE configured with NZP-CSI-RS-ResourceSets configured with higher layer parameter trs-Info may have the CSI-RS resources configured as: 1) periodic, with the CSI-RS resources in the NZP-CSI-RS-ResourceSet configured with the same periodicity, bandwidth, and subcarrier location; and 2) periodic CSI-RS resource in one set and aperiodic CSI-RS resources in a second set, with the aperiodic CSI-RS and periodic CSI-RS resource having the same bandwidth (e.g., with the same ("RB") location) and the aperiodic CSI-RS being 'QCL-Type-A' and 'QCL-TypeD', where applicable, with the periodic CSI-RS resources. For frequency range 2, the UE does not expect that the scheduling offset between the last symbol of the PDCCH carrying the triggering DCI and the first symbol of the aperiodic CSI-RS resources is smaller than the UE reported beamSwitchTiming, when the reported value is one of the values of {14, 28, 48}. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

In certain embodiments: 1) a UE does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'; 2) a UE does not expect to be configured with a CSI-ReportConfig with the higher layer parameter reportQuantity set to other than 'none' for aperiodic NZP CSI-RS resource set configured with trs-Info; 3) a UE does not expect to be configured with a CSI-ReportConfig for periodic NZP CSI-RS resource set configured with trs-Info; and/or 4) a UE does not expect to be configured with a NZP-CSI-RS-ResourceSet configured both with trs-Info and repetition.

In some embodiments, each CSI-RS resource is configured by a higher layer parameter NZP-CSI-RS-Resource with the following restrictions: 1) the time-domain locations of the two CSI-RS resources in a slot, or of the four CSI-RS resources in two consecutive slots (e.g., which are the same across two consecutive slots), as defined by higher layer parameter CSI-RS-resourceMapping, is given by one of a) $l\in\{4,8\}$, $l\in\{5,9\}$ or $l\in\{6,10\}$ for frequency range 1 and frequency range 2, $l\in\{0,4\}$, $l\in\{1,5\}$, $l\in\{2,6\}$, $l\in\{3,7\}$, $l\in\{7,11\}$, $l\in\{8,12\}$ or $l\in\{9,13\}$ for frequency range 2; 2) a single port CSI-RS resource with density $\rho=3$ and higher layer parameter density configured by CSI-RS-ResourceMapping; 3) if carrier $$N_{grid}^{size,\mu}=52,\ N_{BWP,i}^{size}=52,\ \mu=0$$

and the carrier is configured in paired spectrum, the bandwidth of the CSI-RS resource, as given by the higher layer parameter freqBand configured by CSI-RS-ResourceMapping, is X resource blocks, where X≥28 resources if the UE indicates trs-AddBW-Set1 for the trs-AdditionalBandwidth-r16 capability and X≥32 if the UE indicates trs-AddBW-Set2 for the AdditionalBandwidth-r16 capability, in these cases, if the UE is configured with CSI-RS comprising X<52 resource blocks, the UE does not expect that the total number of PRBs allocated for DL transmissions but not overlapped with the PRBs carrying CSI-RS for tracking is more than 4, where all CSI-RS resource configurations shall span the same set of resource blocks; otherwise, the bandwidth of the CSI-RS resource, as given by the higher layer parameter freqBand configured by CSI-RS-ResourceMapping, is the minimum of 52 and $$N_{BWP,i}^{size}$$

resource blocks, or is equal to $$N_{BWP,i}^{size}$$

resource blocks. For operation with shared spectrum channel access, freqBand configured by CSI-RS-ResourceMapping, is the minimum of 48 and $$N_{BWP,i}^{size}$$

resource blocks, or is equal to $$N_{BWP,i}^{size}$$

resource blocks; 4) the UE is not expected to be configured with the periodicity of $2^{\mu}\times10$ slots if the bandwidth of CSI-RS resource is larger than 52 resource blocks; 5) the periodicity and slot offset for periodic NZP CSI-RS resources, as given by the higher layer parameter periodicityAndOffset configured by NZP-CSI-RS-Resource, is one of $2^{\mu}X_p$ slots where $X_p$=10, 20, 40, or 80 and where $\mu$ is defined; and/or 6) the same powerControlOffset and powerControlOffsetSS given by NZP-CSI-RS-Resource value across all resources.

In various embodiments, if a UE is configured with a NZP-CSI-RS-ResourceSet configured with the higher layer parameter repetition set to 'on', the UE may assume that the CSI-RS resources within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

In certain embodiments, if the UE is configured with a CSI-ReportConfig with reportQuantity set to "cri-RSRP", "cri-SINR" or "none" and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (e.g., 1 or 2) of ports with the higher layer parameter nrofPorts for all CSI-RS resources within the set. If the UE is configured with the CSI-RS resource in the same OFDM symbols as an SS/PBCH block, the UE may assume that the CSI-RS and the SS/PBCH block are quasi co-located with 'QCL-TypeD' if 'QCL-TypeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

In some embodiments, if a UE is configured with the higher layer parameter CSI-RS-Resource-Mobility and the higher layer parameter associatedSSB is not configured, the UE shall perform measurements based on CSI-RS-Resource-Mobility and the UE may base the timing of the CSI-RS resource on the timing of the serving cell.

In various embodiments, if a UE is configured with the higher layer parameters CSI-RS-Resource-Mobility and associatedSSB, the UE may base the timing of the CSI-RS resource on the timing of the cell given by the cellId of the CSI-RS resource configuration. Additionally, for a given CSI-RS resource, if the associated SS/PBCH block is configured but not detected by the UE, the UE is not required to monitor the corresponding CSI-RS resource. The higher layer parameter isQuasiColocated indicates whether the associated SS/PBCH block given by the associatedSSB and the CSI-RS resources are quasi co-located with respect to 'QCL-TypeD', when applicable.

In certain embodiments, if a UE is configured with the higher layer parameter CSI-RS-Resource-Mobility and with periodicity greater than 10 ms in paired spectrum, the UE may assume the absolute value of the time difference between radio frame i between any two cells, listed in the configuration with the higher layer parameter CSI-RS-Cell-Mobility and with same refFreqCSI-RS, is less than 153600 Ts.

In various embodiments, if the UE is configured with DRX, the UE is not required to perform measurement of CSI-RS resources other than during the active time for measurements based on CSI-RS-Resource-Mobility. When the UE is configured to monitor DCI format 2_6, the UE is not required to perform measurements other than during the active time and during the timer duration indicated by drx-onDurationTimer also outside active time based on CSI-RS-Resource-Mobility.

In certain embodiments, if the UE is configured with DRX and DRX cycle in use is larger than 80 ms, the UE may not expect CSI-RS resources are available other than during the active time for measurements based on CSI-RS-Resource-Mobility. If the UE is configured with DRX and configured to monitor DCI format 2_6 and DRX cycle in use is larger than 80 ms, the UE may not expect that the CSI-RS resources are available other than during the active time and during the time duration indicated by drx-onDurationTimer also outside active time for measurements based on CSI-RS-Resource-Mobility. Otherwise, the UE may assume CSI-RS are available for measurements based on CSI-RS-Resource-Mobility.

In some embodiments, a UE configured with the higher layer parameters CSI-RS-Resource-Mobility may expect to be configured: 1) with no more than 96 CSI-RS resources per higher layer parameter MeasObjectNR when all CSI-RS resources configured by the same higher layer parameter MeasObjectNR have been configured with associatedSSB; or 2) with no more than 64 CSI-RS resources per higher layer parameter MeasObjectNR when all CSI-RS resources have been configured without associatedSSB or when only some of the CSI-RS resources have been configured with associatedSSB by the same higher layer parameter MeasObjectNR. For frequency range 1, the associatedSSB is optionally present for each CSI-RS resource. For frequency range 2, the associatedSSB is either present for all configured CSI-RS resources or not present for any configured CSI-RS resource per higher layer parameter MeasObjectNR. For any CSI-RS resource configuration, the UE shall assume that the value for parameter cdm-Type is 'noCDM', and there is only one antenna port.

In various embodiments, a UE can be configured with one or more NZP CSI-RS resource set configurations as indicated by the higher layer parameters CSI-ResourceConfig, and NZP-CSI-RS-ResourceSet. Each NZP CSI-RS resource set consists of K≥1 NZP CSI-RS resources.

The following parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration: 1) nzp-CSI-RS-ResourceId determines CSI-RS resource configuration identity; 2) periodicityAndOffset defines the CSI-RS periodicity and slot offset for periodic and/or semi-persistent CSI-RS—all the CSI-RS resources within one set are configured with the same periodicity, while the slot offset can be same or different for different CSI-RS resources; 3) resourceMapping defines the number of ports, CDM-type, and OFDM symbol and subcarrier occupancy of the CSI-RS resource within a slot that are given; 4) nrofPorts in resourceMapping defines the number of CSI-RS ports, where the allowable values are given; 5) density in resourceMapping defines CSI-RS frequency density of each CSI-RS port per PRB, and CSI-RS PRB offset in case of the density value of ½, where the allowable values are given—for density ½, the odd and/or even PRB allocation indicated in density is with respect to the common resource block grid; 6) cdm-Type in resourceMapping defines code division multiplexing ("CDM") values and pattern, where the allowable values are given; 7) powerControlOffset: which is the assumed ratio of a physical downlink shared channel ("PDSCH") energy per resource element ("EPRE") to NZP CSI-RS EPRE when UE derives CSI feedback and takes values in the range of [−8, 15] dB with 1 dB step size; 8) powerControlOffsetSS: which is the assumed ratio of NZP CSI-RS EPRE to SS/PBCH block EPRE; 9) scramblingID defines scrambling ID of CSI-RS with length of 10 bits; 10) BWP-Id in CSI-ResourceConfig defines which bandwidth part the configured CSI-RS is located in; 11) repetition in NZP-CSI-RS-ResourceSet is associated with a CSI-RS resource set and defines whether UE can assume the CSI-RS resources within the NZP CSI-RS resource set are transmitted with the same downlink spatial domain transmission filter or not, and can be configured only when the higher layer parameter reportQuantity associated with all the reporting settings linked with the CSI-RS resource set is set to 'cri-RSRP', 'cri-SINR' or 'none'; 12) qcl-InfoPeriodicCSI-RS contains a reference to a TCI-State indicating QCL source RSs and QCL types—if the TCI-State is configured with a reference to an RS with 'QCL-TypeD' association, that RS may be an SS/PBCH block located in the same or different component carrier ("CC") and/or downlink ("DL") ("CC/DL") bandwidth part ("BWP") or a CSI-RS resource configured as periodic located in the same or different CC/DL BWP; and/or 13) trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same and can be configured when reporting setting is not configured or when the higher layer parameter reportQuantity associated with all the reporting settings linked with the CSI-RS resource set is set to 'none'.

In certain embodiments, all CSI-RS resources within one set are configured with same density and same nrofPorts, except for the NZP CSI-RS resources used for interference measurement. In some embodiments, the UE expects that all the CSI-RS resources of a resource set are configured with the same starting RB and number of RBs and the same cdm-type.

In some embodiments, the bandwidth and initial common resource block ("CRB") index of a CSI-RS resource within a BWP are determined based on the higher layer parameters nrofRBs and startingRB, respectively, within the CSI-FrequencyOccupation information element ("IE") configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If $$startingRB < N_{BWP}^{start},$$

the UE shall assume that the initial CRB index of the CSI-RS resource is $$N_{initial\ RB} = N_{BWP}^{start},$$

otherwise $N_{initial\ RB}$=startingRB. If $$nrofRBs > N_{BWP}^{size} + N_{BWP}^{start} - N_{initial\ RB},$$

the UE shall assume that the bandwidth of the CSI-RS resource is $$N_{CSI-RS}^{BW} = N_{BWP}^{size} + N_{BWP}^{start} - N_{initial\ RB},$$

otherwise $$N_{CSI-RS}^{BW} = nrofRBs.$$

In all cases, the UE shall expect that $$N_{CSI-CS}^{BW} \geq \min(24, N_{BWP}^{size}).$$

In various embodiments, a DownlinkConfigCommonSIB information element ("IE") provides common downlink parameters of a cell.

FIG. 4 is a diagram illustrating one embodiment of a DownlinkConfigCommonSIB IE 400. Table 1 illustrates DownlinkConfigCommonSIB field descriptions, Table 2 illustrates BCCH-Config field descriptions, and Table 3 illustrates PCCH-Config field descriptions.

TABLE 1

| DownlinkConfigCommonSIB Field Descriptions |
| --- |
| bcch-Config<br>The modification period related configuration.<br>frequencyInfoDL-SIB<br>Basic parameters of a downlink carrier and transmission thereon.<br>initialDownlinkBWP<br>The initial downlink BWP configuration for a PCell. The network configures the locationAndBandwidth so that the initial downlink BWP contains the entire CORESET#0 of this serving cell in the frequency domain. The UE applies the locationAndBandwidth upon reception of this field (e.g. to determine the frequency position of signals described in relation to this locationAndBandwidth) but it keeps CORESET#0 until after reception of RRCSetup/RRCResume/RRCReestablishment.<br>nrofPDCCH-MonitoringOccasionPerSSB-InPO<br>The number of PDCCH monitoring occasions corresponding to an SSB within a Paging Occasion.<br>pcch-Config<br>The paging related configuration. |

TABLE 2

| BCCH-Config Field Descriptions |
| --- |
| modificationPeriodCoeff<br>Actual modification period, expressed in number of radio frames m = modificationPeriodCoeff * defaultPagingCycle, see clause 5.2.2.2.2. n2 corresponds to value 2, n4 corresponds to value 4, and so on. |

TABLE 3

| PCCH-Config Field Descriptions |
| --- |
| defaultPagingCycle<br>Default paging cycle, used to derive 'T'. Value rf32 corresponds to 32 radio frames, value rf64 corresponds to 64 radio frames and so on.<br>firstPDCCH-MonitoringOccasionOfPO<br>Points out the first PDCCH monitoring occasion for paging of each PO of the paging frame ("PF").<br>nAndPagingFrame Offset<br>Used to derive the number of total paging frames in T (corresponding to parameter N) and paging frame offset (corresponding to parameter PF_offset). A value of oneSixteenthT corresponds to T / 16, a value of oneEighthT corresponds to T / 8, and so on.<br>If pagingSearchSpace is set to zero and if SS/PBCH block and CORESET multiplexing pattern is 2 or 3:<br>- for ssb-periodicityServingCell of 5 or 10 ms, N can be set to one of {oneT, halfT, |

TABLE 3-continued

| PCCH-Config Field Descriptions |
|---|
| quarterT, oneEighthT, one SixteenthT}<br>- for ssb-periodicityServingCell of 20 ms, N can be set to one of {halfT, quarterT, oneEighthT, oneSixteenthT}<br>- for ssb-periodicityServingCell of 40 ms, N can be set to one of {quarterT, oneEighthT, oneSixteenthT}<br>- for ssb-periodicityServingCell of 80 ms, N can be set to one of {oneEighthT, oneSixteenthT}<br>- for ssb-periodicityServingCell of 160 ms, N can be set to oneSixteenthT<br>If pagingSearchSpace is set to zero and if SS/PBCH block and CORESET multiplexing pattern is 1, N can be set to one of {halfT, quarterT, oneEighthT, oneSixteenthT}<br>If pagingSearchSpace is not set to zero, N can be configured to one of {oneT, halfT, quarterT, oneEighthT, oneSixteenthT} |
| ns<br>Number of paging occasions per paging frame. |

In certain embodiments, a UE may be configured to monitor a paging early indication ("PEI") with a periodicity the same as or a multiple of a paging and/or DRX cycle, where the PEI can indicate to monitor or whether to monitor paging DCI in one or multiple paging occasions of one or multiple paging and/or DRX cycles. In one example, if a UE does not detect a PEI for a paging occasion ("PO") of a paging and/or DRX cycle, the UE monitors paging DCI in the PO of the paging and/or DRX cycle. In another example, if a UE does not detect a PEI for a PO of a paging and/or DRX cycle, the UE does not monitor paging DCI in the PO of the paging and/or DRX cycle. A UE may skip monitoring PEI on a configured PEI monitoring occasion associated with UE's paging occasion in a given paging and/or DRX cycle, if the UE has already determined whether to monitor paging DCI in the paging occasion of the given paging and/or DRX cycle by having received an indication to skip or not to skip monitoring the paging DCI in the given paging and/or DRX cycle.

In some embodiments, PEI can be based on one or more of a PDCCH, a TRS and/or CSI-RS, a wake-up signal ("WUS"), and a secondary synchronization signal ("SSS"). For PDCCH based PEI, a radio network temporary identifier ("RNTI") used for scrambling cyclic redundancy check ("CRC") in PEI-PDCCH can be determined based on at least one selected from a paging frame index, a paging occasion index, and a UE identity ("ID").

If more than one SS/PBCH block is transmitted in a cell, in one implementation, each PEI monitoring occasion (e.g., for PDCCH or WUS) of a set of PEI monitoring occasions may be associated (e.g., quasi-co-located ("QCL")) with a particular SS/PBCH block and/or a particular tracking reference signal ("TRS") and/or CSI-RS resource (e.g., a particular downlink beam). A UE may monitor PEI only on a PEI monitoring occasion associated with a selected SS/PBCH block and/or TRS/CSI-RS resource.

In various embodiments, a network entity may or may not share TRS/CSI-RS occasions configured for connected mode UEs with idle and/or inactive mode UEs. If the network entity shares TRS/CSI-RS occasions configured for connected mode UEs with idle/inactive mode UEs and does not configure a TRS/CSI-RS occasion that is only used by idle/inactive mode UEs, there may not be a TRS/CSI-RS occasion associated with a certain SSB (e.g., one of the SSBs transmitted by the network entity that is not associated (e.g., quasi-co-located) with any of the shared TRS/CSI-RS occasions configured for connected mode UEs). Further, the network entity may or may not transmit TRS/CSI-RS in a configured TRS/CSI-RS occasion. In one implementation, TRS/CSI-RS occasions are configured to be periodically occurring.

In certain embodiments and implementations, CSI-RS refers to NZP-CSI-RS.

In one implementation, a UE receives a cell-specific TRS/CSI-RS configuration (e.g., TRS-ResourceCommon) in a system information block (e.g., SIB1) or in a dedicated RRC message (e.g., in the CellGroupConfig IE), where the TRS/CSI-RS configuration includes at least one TRS/CSI-RS resource set configuration and a TRS/CSI-RS resource set configuration includes one or more TRS/CSI-RS resources. For example, the TRS/CSI-RS resource set configuration includes an even number of TRS/CSI-RS resources (e.g., 2 or 4).

In another implementation, an antenna port with the same port index of all TRS/CSI-RS resources in a given TRS/CSI-RS resource set is the same. In one example, all the TRS/CSI-RS resources in the given TRS/CSI-RS resource set have a single antenna port with density $\rho=3$.

In a further implementation, a subcarrier spacing ("SCS") of a TRS/CSI-RS occasions for idle/inactive UEs is assumed to be same as SCS of an initial DL BWP where the TRS/CSI-RS occasion is configured. In another implementation, SCS of the TRS/CSI-RS occasion is explicitly configured via a part of TRS/CSI-RS configuration parameter.

In certain implementations, frequency domain resource mapping information, scramblingID, and powerControlOffsetSS are signaled once in a TRS/CSI-RS resource set configuration to be applied to (or is common to) all NZP-CSI-RS resources in the TRS/CSI-RS resource set.

In some implementations, first time domain resource mapping information (e.g., an allocated OFDM symbol) is signaled for a first NZP-CSI-RS resource, and a UE can derive time domain resource mapping for remaining NZP-CSI-RS resources in a TRS/CSI-RS resource set based on the first time domain resource mapping information. In some examples, the time domain resource mapping for remaining NZP-CSI-RS resources may also be based on the tdd-UL-DL-ConfigurationCommon (e.g., in SIB1).

In various implementations, a TRS/CSI-RS in a TRS/CSI-RS occasion is assumed to be quasi-collocated ("QCL") with one of SS/PBCH blocks of a cell with respect to a first set of large-scale properties including one or more of delay spread, Doppler spread, Doppler shift, average gain, average delay, and spatial Rx parameters (e.g., 'QCL-TypeC': {Doppler shift, average delay} and 'QCL-TypeD': {Spatial Rx parameter}). The TRS/CSI-RS in the TRS/CSI-RS occasion and a paging PDCCH DM-RS in a paging PDCCH monitoring occasion may be assumed to be quasi-collocated with respect to a second set of large-scale properties (e.g., 'QCL-TypeA': {Doppler shift, Doppler spread, average delay, delay spread} and 'QCL-TypeD': {Spatial Rx parameter}). The QCL relationships may be indicated by indicating a TCI-State providing a QCL source and a QCL type.

In certain embodiments, a UE receives at least one TRS/CSI-RS resource set configuration including information of at least one TRS/CSI-RS resource and determines QCL information of a TRS/CSI-RS resource of the at least one TRS/CSI-RS resource based on a TRS/CSI-RS resource set ID of a TRS/CSI-RS resource set of the at least one TRS/CSI-RS resource set configuration, where the TRS/CSI resource set includes the TRS/CSI-RS resource. For example, one-to-one mapping information between a TRS/CSI-RS resource set identity and a SS/PBCH block index is predefined or configured, and the UE determines a QCL source of the TRS/CSI-RS resource based on the TRS/CSI-RS resource set ID and the mapping information to the SSB index (e.g., the UE determines a SSB index with which quasi-collocation information is provided for the TRS/CSI-RS resource based on the mapping information between the TRS/CSI-RS resource set ID and the SSB index).

In some embodiments, a UE receives at least one TRS/CSI-RS resource set configuration including information of at least one TRS/CSI-RS resource, where each of the at least one TRS/CRS-RS resource set configuration includes explicitly indicated QCL information (e.g., an SSB index). The UE determines QCL information of a TRS/CSI resource of a TRS/CSI-RS resource set based on explicitly indicated QCL information in the TRS/CSI-RS resource set configuration.

Examples 1A-1D provide exemplary RRC parameters to configure TRS occasions for idle/inactive UEs.

In example 1A there may be a TRS-ResourceCommon IE. The TRS-ResourceCommon IE is used to cell-specifically configure one or more TRS resource sets configured with TRS in a cell where the IE is included, which an idle or inactive UE may be configured to use for time and frequency tracking. FIG. 5 is a diagram illustrating one embodiment of a TRS-ResourceCommon IE 500.

In example 1B there may be a TRS-ResourceSet IE. The TRS-ResourceSet IE includes a set of TRS resources and set-specific parameters. FIG. 6 is a diagram illustrating one embodiment of a TRS-ResourceSet IE 600. Table 4 illustrates TRS-ResourceSet field descriptions.

TABLE 4

| TRS-ResourceSet Field Descriptions |
|---|
| periodicityAndOffset<br>Periodicity and slot offset sl1 corresponds to a periodicity of 1 slot, sl2 to a periodicity of two slots, and so on. The corresponding offset is also given in number of slots for the first TRS resource. The second TRS resource has the same slot offset as the first TRS resource. The third and fourth TRS resources, if configured, have the slot offset same as the indicated slot offset plus 1. |
| powerControlOffsetSS<br>Power offset of non-zero power TRS RE to SSS RE. Value in dB. |
| qcl-InfoTRS<br>For a target TRS, contains a reference to one SSB index for providing the QCL source. If not included, TRS-ResourceSetId indicates an SSB index for the QCL source. |
| resourceMapping<br>OFDM symbol location(s) in a slot and subcarrier occupancy in a PRB of the TRS resource. |
| scramblingID<br>Scrambling ID. |

In an example 1C there may be a TRS-ResourceMapping IE. The TRS-ResourceMapping IE is used to configure the resource element mapping for at least one TRS resource in time and frequency domains. FIG. 7 is a diagram illustrating one embodiment of a TRS-ResourceMapping IE 700. Table 5 illustrates TRS-ResourceMapping field descriptions.

TABLE 5

| TRS-ResourceMapping Field Descriptions |
|---|
| firstOFDMSymbolInTimeDomain<br>Time domain allocation within a physical resource block. The field indicates the first OFDM symbol in the PRB used for TRS. Value 2 is supported only when dmrs-TypeA-Position equals pos3. |
| freqBand<br>Wideband or partial band TRS. |
| frequencyDomainAllocation<br>Frequency domain allocation within a physical resource block. Bitmap for row 1, i.e. the value of $k_i$ of row 1 is given by the bitmap $[b_3 \ldots b_0]$, $k_{i-1} = f(i)$, where f(i) is the bit number of the $i^{th}$ bit in the bitmap set to one. |

In an example 1D there may be a CSI-ResourcePeriodicityAndOffset IE. The CSI-ResourcePeriodicityAndOffset IE is used to configure a periodicity and a corresponding offset for periodic and semi-persistent CSI resources, and for periodic and semi-persistent reporting on a physical uplink control channel ("PUCCH"). Both the periodicity and the offset are given in a number of slots. The periodicity value slots4 corresponds to 4 slots, value slots5 corresponds to 5 slots, and so forth. FIG. 8 is a diagram illustrating one embodiment of a CSI-ResourcePeriodicityAndOffset IE 800.

In various embodiments, a UE receives an implicit indication of QCL information of configured TRS/CSI-RS occasions and determines a QCL source of a TRS/CSI-RS occasion (e.g., of a TRS/CSI-RS resource in the TRS/CSI-RS occasion) of the configured TRS/CSI-RS occasions based on the implicit indication. A TRS/CSI-RS occasion includes one or more TRS/CSI-RS resources (e.g., in a TRS/CSI-RS resource set) located in a same slot or adjacent slots, and the one or more TRS/CSI resources of the TRS/CSI-RS occasion have the same QCL source.

In one implementation, QCL information of configured TRS/CSI-RS occasions is indicated via a bitmap, where a length of the bitmap is based on the maximum number of SS/PBCH blocks per half frame (e.g., the bitmap length is the same as 'ssb-PositionsInBurst'). The number of bits with value '1' in the bitmap corresponds to the number of configured TRS/CSI-RS occasions in a cell. Each configured TRS/CSI-RS occasion is sequentially mapped to a bit with value '1' (e.g., starting from the first/leftmost bit to determine the QCL source SSB index for a particular TRS/CSI-RS occasion) and accordingly, a corresponding SSB index, where the first/leftmost bit of the bitmap corresponds to SS/PBCH block index 0, the second bit of the bitmap corresponds to SS/PBCH block index 1, and so forth.

In one example, a bitfield for indicating availability of TRS/CSI-RS on configured TRS/CSI-RS occasions within a particular DRX/paging cycle can be configured in a PDCCH based PEI or the availability of TRS/CSI-RS is indicated by a PEI. A bitwidth of the bitfield may be determined based on the number of configured TRS/CSI-RS occasions in a cell, where each TRS/CSI-RS occasion is mapped to one SSB index. The first/leftmost bit of the bitfield corresponds to TRS/CSI-RS occasion/resource set index 0, the second bit corresponds to TRS/CSI-RS resource set index 1, and so on. Value 0 in the bitmap indicates that the corresponding TRS/CSI-RS occasion/resource set is not available while value 1 indicates that the corresponding TRS/CSI-RS occasion/resource set is available. A UE assumes TRS/CSI-RS is not present if the network entity indicates it as not available.

In another example, a bitwidth of a bitfield indicating availability of TRS/CSI-RS may be based on the number of TRS/CSI-RS occasions of a particular QCL source (e.g., associated with a particular SSB index) within a particular DRX/paging cycle (or a predefined/configured number of DRX/paging cycles), where the UE identifies the particular QCL source (or the particular SSB index) based on a QCL source of a PDCCH monitoring occasion for PEI. For example, the first/leftmost bit of the bitfield corresponds to the earliest TRS/CSI-RS occasion associated with the particular QCL resource within the particular DRX/paging cycle, the second bit corresponds to the second earliest TRS/CSI-RS occasion associated with the particular QCL resource within the particular DRX/paging cycle, and so forth. If a TRS/CSI-RS occasion of a particular QCL source is not configured, the UE assumes that the bitwidth of the bitfield is zero, that is, the bitfield indicating the availability of TRS/CSI-RS does not exist. In a further example, a bitwidth of a bitfield indicating availability of TRS/CSI-RS is one if at least one TRS/CSI-RS occasion of a particular QCL source is configured; otherwise, the bitfield does not exist (or is reserved). The one bit, if it exists (or if it is used), indicates whether a UE can assume that TRS/CSI-RS is present on all TRS/CSI-RS occasions associated with a particular QCL source within a particular DRX/paging cycle.

In an example implementation of an example 2, all TRS/CSI-RS occasions configured for idle/inactive UEs have the same periodicity and the same resource mapping. A first slot offset value indicated by the parameter periodicityAndOffset corresponds to a slot offset for the first TRS/CSI-RS occasion, and slot offsets for the remaining TRS/CSI-RS occasions are determined based on the first slot offset value and an order of a given TRS/CSI-RS occasion among all the configured TRS/CSI-RS occasions (and possibly on the tdd-UL-DL-ConfigurationCommon). For example, if the number of NZP-CSI-RS resources per TRS/CSI-RS occasion is 2 (e.g., one TRS/CSI-RS occasion spans 1 slot), the slot offsets for the remaining TRS/CSI-RS occasions are determined by increasing the first slot offset value by one sequentially, e.g., a slot offset for the second TRS/CSI-RS occasion is the first slot offset value plus one, and a slot offset for the third TRS/CSI-RS occasion is the first slot offset value plus two, and so forth. If the number of NZP-CSI-RS resources per TRS/CSI-RS occasion is 4 (e.g., one TRS/CSI-RS occasion spans 2 slots), the slot offsets for the remaining TRS/CSI-RS occasions are determined by increasing the first slot offset value by two sequentially.

In example 2 there may be a TRS-ResourceCommon2 IE. The TRS-ResourceCommon2 IE is used to cell-specifically configure one or more TRS resources in a cell where the IE is included, which an idle or inactive UE may be configured to use for time and frequency tracking. FIG. 9 is a diagram illustrating one embodiment of a TRS-ResourceCommon2 IE 900. Table 6 illustrates TRS-ResourceCommon2 field descriptions.

TABLE 6

| TRS-ResourceCommon2 Field Descriptions |
|---|
| longBitmap<br>Bitmap when maximum number of SS/PBCH blocks per half frame equals to 64. |
| mediumBitmap<br>Bitmap when maximum number of SS/PBCH blocks per half frame equals to 8. |
| shortBitmap<br>Bitmap when maximum number of SS/PBCH blocks per half frame equals to 4. |
| trs-qclPositionsInBurst<br>The bitmap indicates SSB indexes for QCL sources of TRS occasions, where a SSB with a SSB index is quasi-co-located to a TRS occasion of configured TRS occasions. The first/leftmost bit corresponds to SS/PBCH block index 0, the second bit corresponds to |

TABLE 6-continued

| TRS-ResourceCommon2 Field Descriptions |
|---|
| SS/PBCH block index 1, and so on. Value 0 in the bitmap indicates that a TRS occasion associated with the corresponding SS/PBCH block is not configured while value 1 indicates that a TRS occasion associated with the corresponding SS/PBCH block is configured. For operation with shared spectrum channel access, only mediumBitmap is used. |
| n-NZP-CSI-RS-perOccasion |
| The number of NZP-CSI-RS (i.e. TRS/CSI-RS) resources per TRS/CSI-RS occasion |

In some embodiments, a UE antenna panel may be a physical or logical antenna array including a set of antenna elements or antenna ports that share a common or a significant portion of a radio frequency ("RF") chain (e.g., in-phase/quadrature ("I/Q") modulator, analog to digital ("A/D") converter, local oscillator, phase shift network). The UE antenna panel or "UE panel" may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (also referred to herein as active elements) of an antenna panel requires biasing or powering on of the RF chain which results in current drain or power consumption in the UE associated with the antenna panel (e.g., including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In various embodiments, depending on a UE's own implementation, a "UE panel" can have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to the gNB. For certain conditions, the gNB or network can assume the mapping between UE's physical antennas to the logical entity "UE panel" may not be changed. For example, the condition may include until the next update or report from the UE or include a duration of time over which the gNB assumes there will be no change to the mapping. The UE may report its UE capability with respect to the "UE panel" to the gNB or network. The UE capability may include at least the number of "UE panels". In one implementation, the UE may support UL transmission from one beam within a panel; with multiple panels, more than one beam (e.g., one beam per panel) may be used for UL transmission. In another implementation, more than one beam per panel may be supported and/or used for UL transmission.

Figure 10:
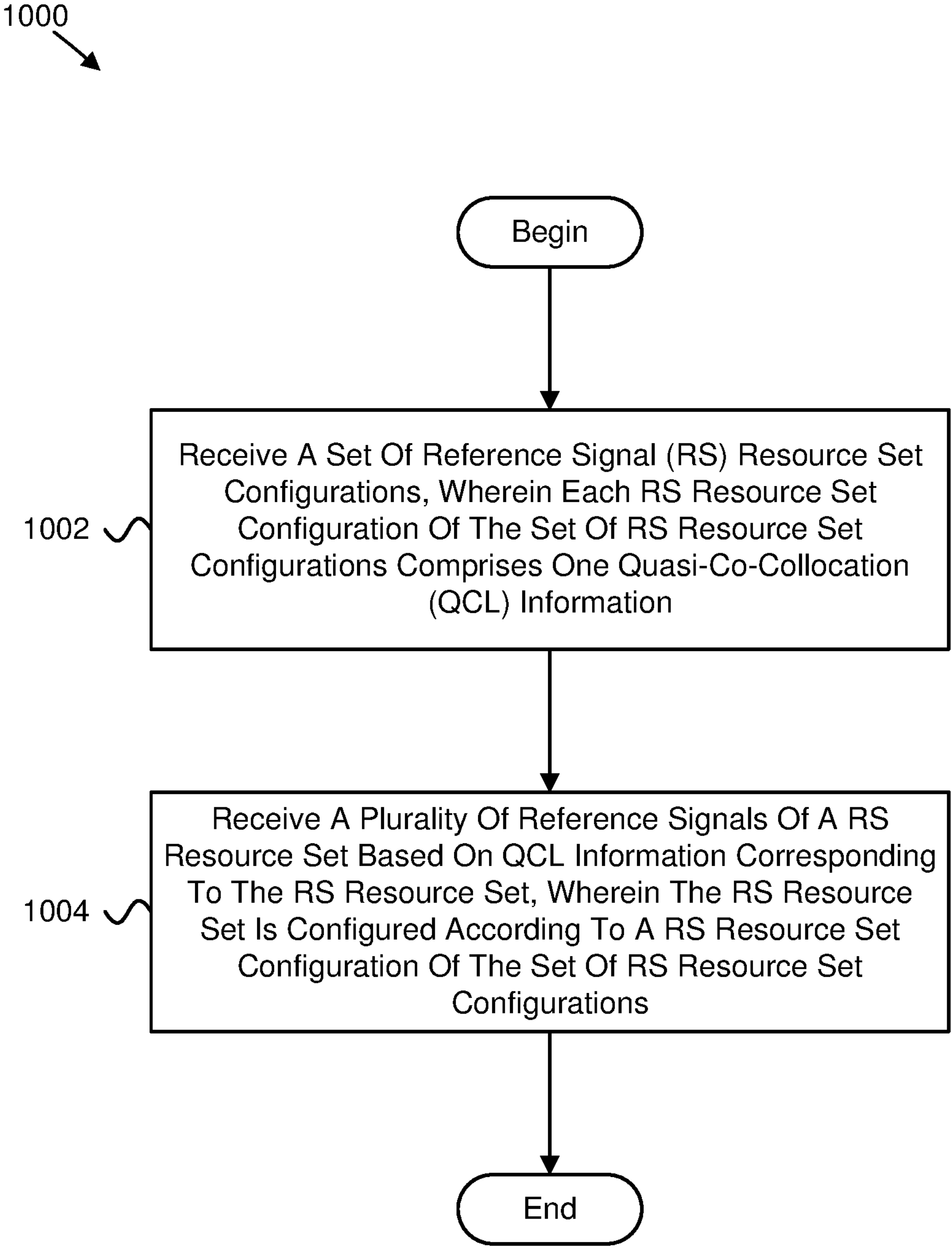
FIG. 10 is a flow chart diagram illustrating one embodiment of a method for configuring a reference signal resource set based on quasi-co-location information.

FIG. 10 is a flow chart diagram illustrating one embodiment of a method 1000 for configuring a reference signal resource set based on quasi-co-location information. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002, at a user equipment (UE), a set of reference signal (RS) resource set configurations. Each RS resource set configuration of the set of RS resource set configurations includes one quasi-co-collocation (QCL) information. In some embodiments, the method 1000 includes receiving 1004 a plurality of reference signals of a RS resource set based on QCL information corresponding to the RS resource set. The RS resource set is configured according to a RS resource set configuration of the set of RS resource set configurations.

In certain embodiments, the QCL information corresponding to the RS resource set is applicable to the plurality of reference signals of the RS resource set. In some embodiments, the plurality of reference signals of the RS resource set are quasi-co-located with a synchronization signal and physical broadcast channel block (SSB). In various embodiments, the QCL information of the RS resource set comprises an SSB index as a QCL source.

In one embodiment, the method 1000 further comprises identifying a subset of SSBs from a plurality of SSBs transmitted by a network device, wherein each SSB of the subset of SSBs is associated with at least one RS resource set of a set of RS resource sets configured based on the set of RS resource set configurations. In certain embodiments, the method 1000 further comprises selecting a SSB from the subset of SSBs, wherein receiving comprises receiving the plurality of reference signals of the RS resource set associated with the selected SSB. In some embodiments, the method 1000 further comprises receiving a bitfield indicating respective availability information for each of a set of RS resource sets, wherein the set of RS resource sets are configured based on the set of RS resource set configurations.

In various embodiments, the method 1000 further comprises receiving bit location information within a bitfield corresponding to the RS resource set, wherein a bit corresponding to the bit location within the bitfield indicates availability of the RS resource set. In one embodiment, the bitfield is received in downlink control information (DCI) including a paging early indication. In certain embodiments, the bitfield is received in paging DCI, wherein the paging DCI is monitored in a paging occasion.

Figure 11:
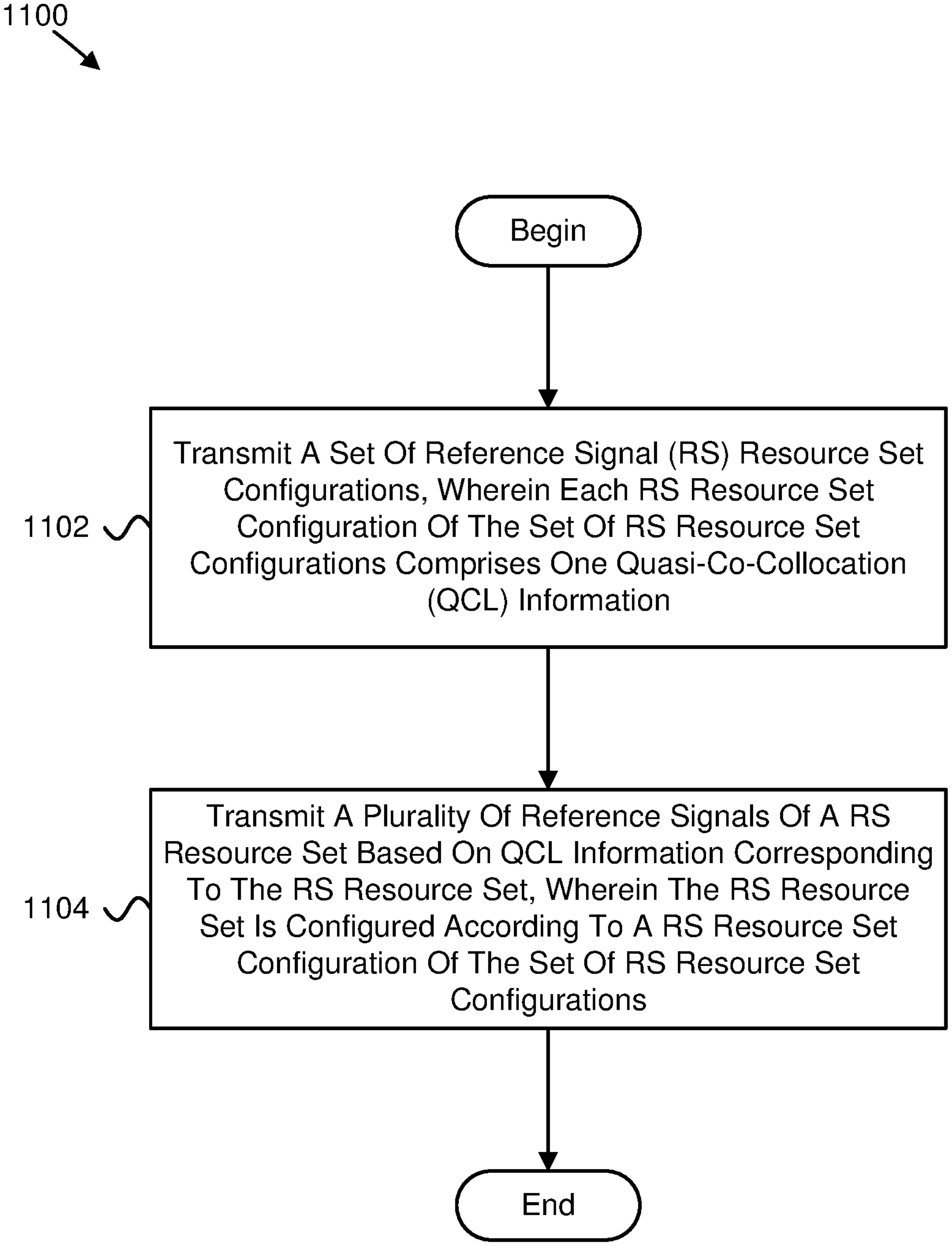
FIG. 11 is a flow chart diagram illustrating another embodiment of a method for configuring a reference signal resource set based on quasi-co-location information.

FIG. 11 is a flow chart diagram illustrating another embodiment of a method 1100 for configuring a reference signal resource set based on quasi-co-location information. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes transmitting 1102, from a network device, a set of reference signal (RS) resource set configurations. Each RS resource set configuration of the set of RS resource set configurations includes one quasi-co-collocation (QCL) information. In some embodiments, the method 1100 includes transmitting 1104 a plurality of reference signals of a RS resource set based on QCL information corresponding to the RS resource set. The RS resource set is configured according to a RS resource set configuration of the set of RS resource set configurations.

In certain embodiments, the QCL information corresponding to the RS resource set is applicable to the plurality of reference signals of the RS resource set. In some embodiments, the QCL information of the RS resource set comprises a synchronization signal and physical broadcast channel block (SSB) index as a QCL source.

In various embodiments, the method 1100 further comprises transmitting a bitfield indicating respective availability information for each of a set of RS resource sets, wherein the set of RS resource sets are configured based on the set of RS resource set configurations. In one embodiment, the method 1100 further comprises transmitting bit location information within the bitfield corresponding to the RS resource set, wherein a bit corresponding to the bit location within the bitfield indicates availability of the RS resource set.

In one embodiment, an apparatus comprises a receiver that: receives, at a user equipment (UE), a set of reference signal (RS) resource set configurations, wherein each RS resource set configuration of the set of RS resource set configurations comprises one quasi-co-collocation (QCL) information; and receives a plurality of reference signals of a RS resource set based on QCL information corresponding to the RS resource set, wherein the RS resource set is configured according to a RS resource set configuration of the set of RS resource set configurations.

In certain embodiments, the QCL information corresponding to the RS resource set is applicable to the plurality of reference signals of the RS resource set.

In some embodiments, the plurality of reference signals of the RS resource set are quasi-co-located with a synchronization signal and physical broadcast channel block (SSB).

In various embodiments, the QCL information of the RS resource set comprises an SSB index as a QCL source.

In one embodiment, the apparatus further comprises a processor that identifies a subset of SSBs from a plurality of SSBs transmitted by a network device, wherein each SSB of the subset of SSBs is associated with at least one RS resource set of a set of RS resource sets configured based on the set of RS resource set configurations.

In certain embodiments, the processor selects a SSB from the subset of SSBs, and the receiver receiving comprises the receiver receiving the plurality of reference signals of the RS resource set associated with the selected SSB.

In some embodiments, the receiver receives a bitfield indicating respective availability information for each of a set of RS resource sets, and the set of RS resource sets are configured based on the set of RS resource set configurations.

In various embodiments, the receiver receives bit location information within a bitfield corresponding to the RS resource set, a bit corresponding to the bit location within the bitfield indicates availability of the RS resource set.

In one embodiment, the bitfield is received in downlink control information (DCI) including a paging early indication.

In certain embodiments, the bitfield is received in paging DCI, wherein the paging DCI is monitored in a paging occasion.

In one embodiment, a method in a user equipment (UE) comprises: receiving a set of reference signal (RS) resource set configurations, wherein each RS resource set configuration of the set of RS resource set configurations comprises one quasi-co-collocation (QCL) information; and receiving a plurality of reference signals of a RS resource set based on QCL information corresponding to the RS resource set, wherein the RS resource set is configured according to a RS resource set configuration of the set of RS resource set configurations.

In certain embodiments, the QCL information corresponding to the RS resource set is applicable to the plurality of reference signals of the RS resource set.

In some embodiments, the plurality of reference signals of the RS resource set are quasi-co-located with a synchronization signal and physical broadcast channel block (SSB).

In various embodiments, the QCL information of the RS resource set comprises an SSB index as a QCL source.

In one embodiment, the method further comprises identifying a subset of SSBs from a plurality of SSBs transmitted by a network device, wherein each SSB of the subset of SSBs is associated with at least one RS resource set of a set of RS resource sets configured based on the set of RS resource set configurations.

In certain embodiments, the method further comprises selecting a SSB from the subset of SSBs, wherein receiving comprises receiving the plurality of reference signals of the RS resource set associated with the selected SSB.

In some embodiments, the method further comprises receiving a bitfield indicating respective availability information for each of a set of RS resource sets, wherein the set of RS resource sets are configured based on the set of RS resource set configurations.

In various embodiments, the method further comprises receiving bit location information within a bitfield corresponding to the RS resource set, wherein a bit corresponding to the bit location within the bitfield indicates availability of the RS resource set.

In one embodiment, the bitfield is received in downlink control information (DCI) including a paging early indication.

In certain embodiments, the bitfield is received in paging DCI, wherein the paging DCI is monitored in a paging occasion.

In one embodiment, an apparatus comprises a transmitter that: transmits, from a network device, a set of reference signal (RS) resource set configurations, wherein each RS resource set configuration of the set of RS resource set configurations comprises one quasi-co-collocation (QCL) information; and transmits a plurality of reference signals of a RS resource set based on QCL information corresponding to the RS resource set, wherein the RS resource set is configured according to a RS resource set configuration of the set of RS resource set configurations.

In certain embodiments, the QCL information corresponding to the RS resource set is applicable to the plurality of reference signals of the RS resource set.

In some embodiments, the QCL information of the RS resource set comprises a synchronization signal and physical broadcast channel block (SSB) index as a QCL source.

In various embodiments, the transmitter transmits a bitfield indicating respective availability information for each of a set of RS resource sets, and the set of RS resource sets are configured based on the set of RS resource set configurations.

In one embodiment, the transmitter transmits bit location information within the bitfield corresponding to the RS resource set, and a bit corresponding to the bit location within the bitfield indicates availability of the RS resource set.

In one embodiment, a method in a network device comprises: transmitting a set of reference signal (RS) resource set configurations, wherein each RS resource set configuration of the set of RS resource set configurations comprises one quasi-co-collocation (QCL) information; and transmitting a plurality of reference signals of a RS resource set based on QCL information corresponding to the RS resource set, wherein the RS resource set is configured according to a RS resource set configuration of the set of RS resource set configurations.

In certain embodiments, the QCL information corresponding to the RS resource set is applicable to the plurality of reference signals of the RS resource set.

In some embodiments, the QCL information of the RS resource set comprises a synchronization signal and physical broadcast channel block (SSB) index as a QCL source.

In various embodiments, the method further comprises transmitting a bitfield indicating respective availability information for each of a set of RS resource sets, wherein the set of RS resource sets are configured based on the set of RS resource set configurations.

In one embodiment, the method further comprises transmitting bit location information within the bitfield corresponding to the RS resource set, wherein a bit corresponding to the bit location within the bitfield indicates availability of the RS resource set.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
- at least one memory; and
- at least one processor coupled with the at least one memory and configured to cause the UE to:
  - receive a set of reference signal (RS) resource set configurations, wherein each RS resource set configuration of the set of RS resource set configurations comprises one quasi-co-collocation (QCL) information;
  - receive a plurality of reference signals of a RS resource set based on QCL information corresponding to the RS resource set, wherein the RS resource set is configured according to a RS resource set configuration of the set of RS resource set configurations; and
  - receive bit location information within a bitfield corresponding to the RS resource set, wherein a bit corresponding to a bit location of the bit location information within the bitfield indicates availability of the RS resource set, wherein:
    - the bitfield is received in downlink control information (DCI) including a paging early indication; or
    - the bitfield is received in a paging DCI, wherein the paging DCI is monitored in a paging occasion.

2. The UE of claim 1, wherein the QCL information corresponding to the RS resource set is applicable to the plurality of reference signals of the RS resource set.

3. The UE of claim 1, wherein the QCL information of the RS resource set comprises a synchronization signal and physical broadcast channel block (SSB) index as a QCL source.

4. The UE of claim 1, wherein the at least one processor is configured to cause the UE to identify a subset of broadcast channel blocks (SSBs) from a plurality of SSBs, wherein each SSB of the subset of SSBs is associated with at least one RS resource set of a set of RS resource sets configured based on the set of RS resource set configurations.

5. The UE of claim 4, wherein the at least one processor is configured to cause the UE to select a SSB from the subset of broadcast channel blocks (SSBs) and receive the plurality of reference signals of the RS resource set associated with the selected SSB.

6. The UE of claim 1, wherein the at least one processor is configured to cause the UE to receive the bitfield indicating respective availability information for each of a set of RS resource sets comprising the RS resource set, and the set of RS resource sets are configured based on the set of RS resource set configurations.

7. A method performed by a user equipment (UE), the method comprising:
- receiving a set of reference signal (RS) resource set configurations, wherein each RS resource set configuration of the set of RS resource set configurations comprises one quasi-co-collocation (QCL) information;
- receiving a plurality of reference signals of a RS resource set based on QCL information corresponding to the RS resource set, wherein the RS resource set is configured according to a RS resource set configuration of the set of RS resource set configurations; and
- receiving bit location information within a bitfield corresponding to the RS resource set, wherein a bit corresponding to a bit location of the bit location information within the bitfield indicates availability of the RS resource set, wherein:
  - the bitfield is received in downlink control information (DCI) including a paging early indication; or
  - the bitfield is received in paging DCI, wherein the paging DCI is monitored in a paging occasion.

8. A base station for wireless communication, comprising:
- at least one memory; and
- at least one processor coupled with the at least one memory and configured to cause the base station to:
  - transmit a set of reference signal (RS) resource set configurations, wherein each RS resource set configuration of the set of RS resource set configurations comprises one quasi-co-collocation (QCL) information;
  - transmit a plurality of reference signals of a RS resource set based on QCL information corresponding to the RS resource set, wherein the RS resource set is configured according to a RS resource set configuration of the set of RS resource set configurations; and
  - transmit bit location information within a bitfield corresponding to the RS resource set, a bit corresponding to a bit location of the bit location information within the bitfield indicates availability of the RS resource set, wherein:

the bitfield is transmitted in downlink control information (DCI) including a paging early indication; or the bitfield is transmitted in paging DCI, wherein the paging DCI is transmitted in a paging occasion.

9. The apparatus of claim 8, wherein the QCL information corresponding to the RS resource set is applicable to the plurality of reference signals of the RS resource set.

10. The base station of claim 8, wherein the QCL information of the RS resource set comprises a synchronization signal and physical broadcast channel block (SSB) index as a QCL source.

11. The base station of claim 8, wherein the at least one processor is configured to cause the base station to transmit a bitfield indicating respective availability information for each of a set of RS resource sets comprising the RS resource set, and the set of RS resource sets are configured based on the set of RS resource set configurations.

12. A method performed by a base station, comprising:

transmitting a set of reference signal (RS) resource set configurations, wherein each RS resource set configuration of the set of RS resource set configurations comprises one quasi-co-collocation (QCL) information;

transmitting a plurality of reference signals of a RS resource set based on QCL information corresponding to the RS resource set, wherein the RS resource set is configured according to a RS resource set configuration of the set of RS resource set configurations; and transmitting bit location information within a bitfield corresponding to the RS resource set, and a bit corresponding to the bit location within the bitfield indicates availability of the RS resource set, wherein:

the bitfield is received in downlink control information (DCI) including a paging early indication; or the bitfield is received in paging DCI, wherein the paging DCI is transmitted in a paging occasion.

13. The method of claim 12, wherein the QCL information corresponding to the RS resource set is applicable to the plurality of reference signals of the RS resource set.

14. The method of claim 12, wherein the QCL information of the RS resource set comprises a synchronization signal and physical broadcast channel block (SSB) index as a QCL source.

15. The method of claim 12, further comprising transmitting a plurality of SSBs to a user equipment (UE), wherein a subset of the plurality of SSBs is associated with the RS resource set of a set of RS resource sets.

* * * * *